(12) United States Patent
O'Brien et al.

(10) Patent No.: US 6,217,098 B1
(45) Date of Patent: Apr. 17, 2001

(54) INSTRUMENT PANEL TOP COVER WITH INTEGRAL FOAMED COMPONENTS

(75) Inventors: Timothy F. O'Brien, White Lake; Joseph J. Davis, Jr., Ortonville; Michael Hier, Royal Oak, all of MI (US)

(73) Assignee: Lear Automotive Dearborn, Inc., Southfield, MI (US)

( * ) Notice: Subject to any disclaimer, the term of this patent is extended or adjusted under 35 U.S.C. 154(b) by 0 days.

(21) Appl. No.: 09/190,321

(22) Filed: Nov. 12, 1998

(51) Int. Cl.[7] .............................. B62D 25/14; B60K 37/04
(52) U.S. Cl. ................................................................ 296/70
(58) Field of Search ................................................. 296/70

(56) References Cited

U.S. PATENT DOCUMENTS 5,333,901 * 8/1994 Barnes ................................. 280/732
5,622,402 * 4/1997 Pritchard et al. .................... 296/191

* cited by examiner

Primary Examiner—D. Glenn Dayoan
Assistant Examiner—Greg Blankenship
(74) Attorney, Agent, or Firm—MacMillan, Sobanski & Todd, LLC

(57) ABSTRACT

An instrument panel top cover is provided with an integrally molded foam underside. The integrally molded foam underside provides a number of components that have been supplied separately in the prior art. The use of the integrally molded foam underside thus eliminates the need for many separate components and improves upon the instrument panel top covers of the prior art.

11 Claims, 4 Drawing Sheets

INSTRUMENT PANEL TOP COVER WITH INTEGRAL FOAMED COMPONENTS

BACKGROUND OF THE INVENTION

This invention relates to the use of a foam backing for an instrument panel top cover which integrally provides a number of components which had been previously provided by separate parts.

Vehicle interiors are becoming more and more complex. There is a good deal of emphasis on eliminating any perceived "seams" within the interior of a vehicle, and further in providing simple interior trim structure which supports the ever-increasing number of components and systems mounted within the vehicle.

One particularly challenging area is the top of the instrument panel. Typically, an instrument panel includes a facing trim member facing the passenger cabin of the vehicle. A top cover is snapped into a space between the windshield and the instrument panel. This top cover must enclose a number of electrical and ventilation systems. Typically, the top cover has been provided with a soundinsulating material underlying the outer plastic skin. This sound-insulating material has typically been provided by cloth, foam, or other materials attached to the rear face of the plastic skin. In addition, many other components are attached to the top cover prior to attachment of the top cover. In particular, a windshield seal is placed on one edge of the top cover skin to seal between the top cover and the windshield. In addition, a number of spacers are usually attached to the bottom surface of the top cover to provide spacing between the top cover and underlying support surfaces. Supply ducts for supplying air to vents within the top cover are also attached. Typically, gaskets or seals are placed between each duct and the top cover.

Speakers are often attached beneath the top cover. A foam gasket is typically placed between the top cover and each speaker grill. In addition, squeak edge tape is placed between the edge of the top cover that will contact the instrument panel and the instrument panel. Each of these components have typically been supplied as separate parts which must be attached to the top cover.

SUMMARY OF THE INVENTION

In a disclosed embodiment of this invention, the sound insulation for an instrument panel top cover is provided by an underlying foam backing material. The foam backing material is provided to be thick enough such that it will provide desirable sound-deadening characteristics. Also, the foam covers the majority of the surface area of the top cover. In addition, the windshield seal is integrally molded around the top cover skin by this same foam.

In preferred embodiments, the spacers are also integrally molded out of the foam. In addition, the duct for supplying air to the vent within the top cover is also formed integrally by the foam at the time of foaming. The gaskets provided between the duct and the air supply are also foamed at that time.

In addition, most preferably, the gasket for connecting the top cover to the speaker is also integrally foamed at that time. The squeak edge tape is also integrally foamed.

The present invention eliminates the need for a number of separate components in instrument panel top covers, and thus reduces the complexity of forming instrument panel top covers.

These and other features of the present invention can be best understood from the following specification and drawings, the following of which is a brief description.

DETAILED DESCRIPTION

Figure 1:
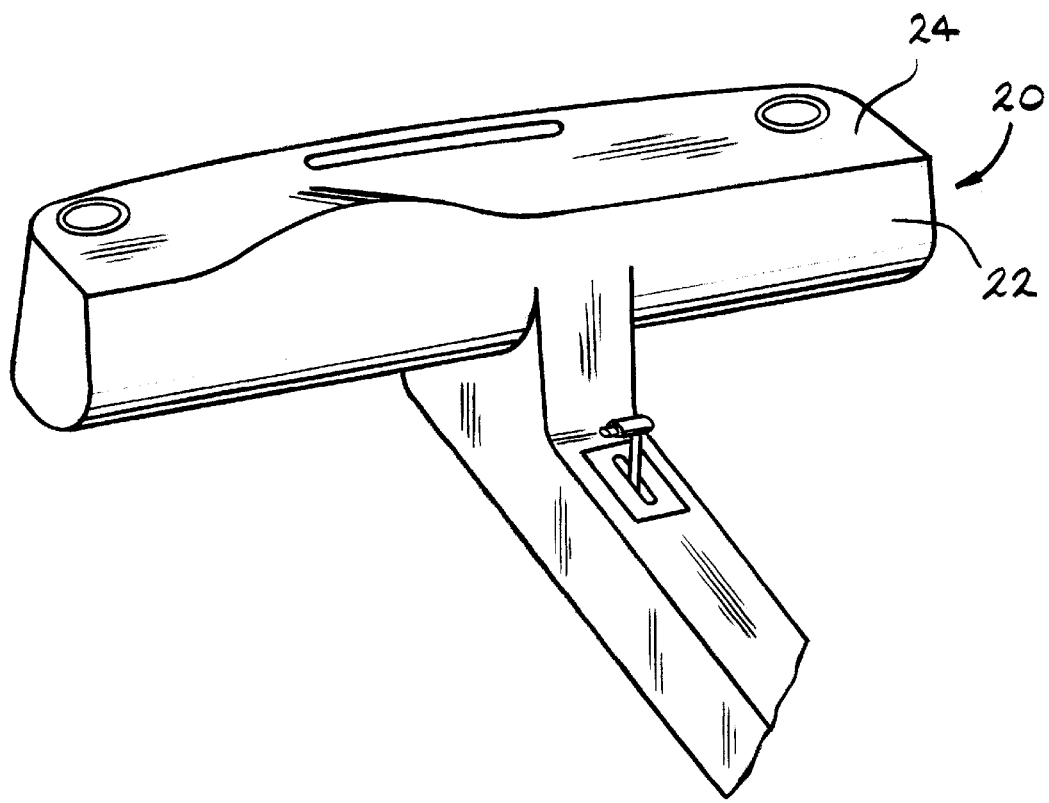
FIG. 1 is a schematic view of a prior art instrument panel.

A known instrument panel is shown schematically at 20 in FIG. 1. The instrument panel includes a front instrument panel portion 22 and an instrument panel top cover 24.

Figure 2:
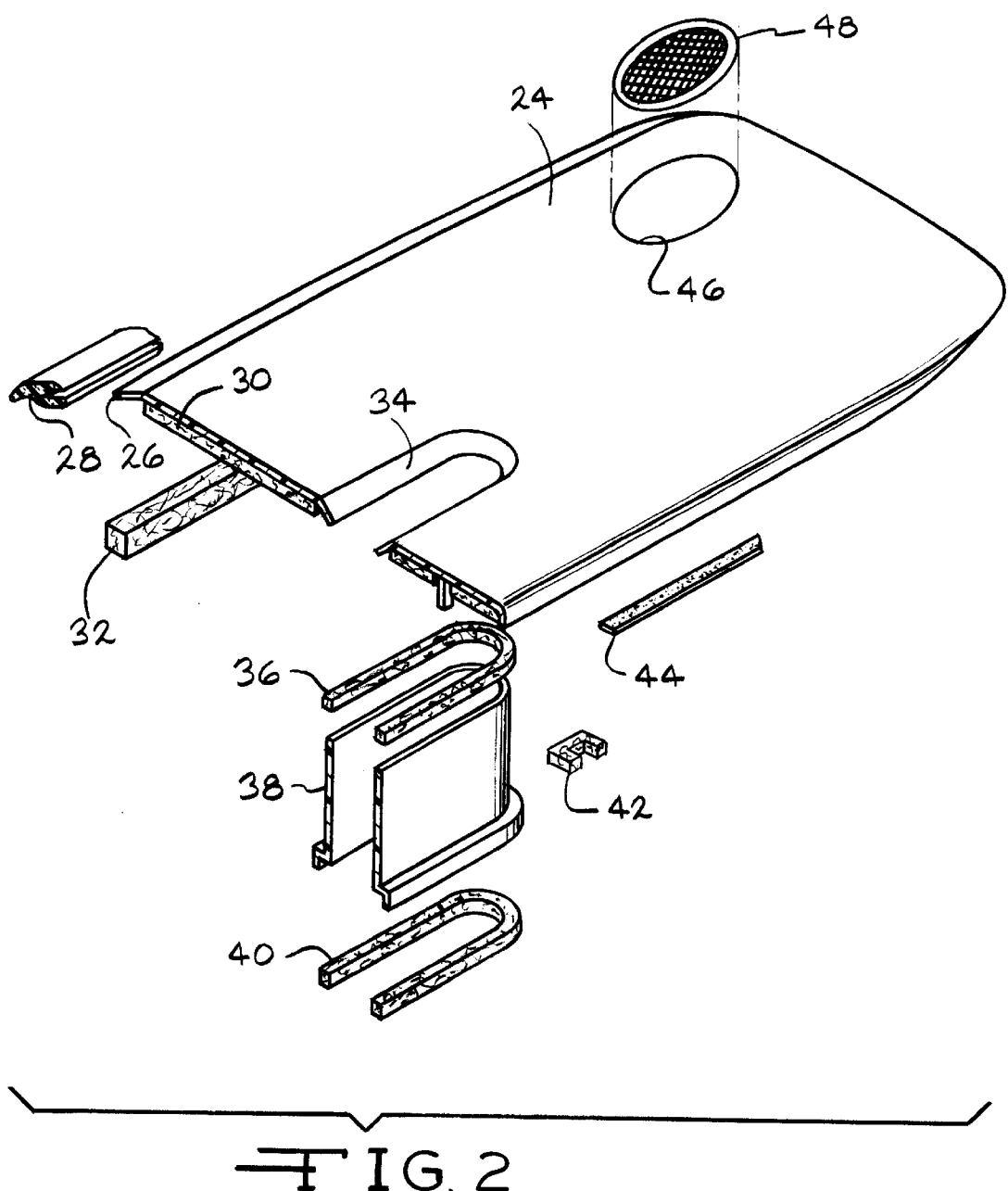
FIG. 2 is a view of a prior art instrument panel top cover.

As shown in FIG. 2, top cover 24 typically includes a forward lip 26 which is received within a windshield seal 28. The windshield seal 28 generally extends along the length of the top cover (only a small portion of seal 28 is shown) and seals between the top cover and the windshield. Further, sound-deadening material 30 is typically attached to the undersurface of the top cover 24. This sound-deadening material may be formed of cotton fiber, or foam glued to the underside of the top cover.

Spacers 32 are typically provided by foam and glued to the bottom of the top cover to provide a spacer between the top cover and an underlying surface. An opening 46 provides an air vent in the top cover 24. Typically, a foam gasket 36 is placed above a duct 38 and a bottom gasket 40 is placed beneath the duct 38. This is then connected to an air supply to supply air, such as defroster air, through the top cover 24.

Other spacers 42 may be placed at selected locations on the top cover. Further, anti-squeak tape 44 is also placed adjacent a forward lip of the top cover to eliminate squeaking between the top cover 24 and the instrument panel 22.

As can be appreciated from FIG. 2, the assembly of the top cover includes a number of separate parts, and thus is complicated.

Figure 3:
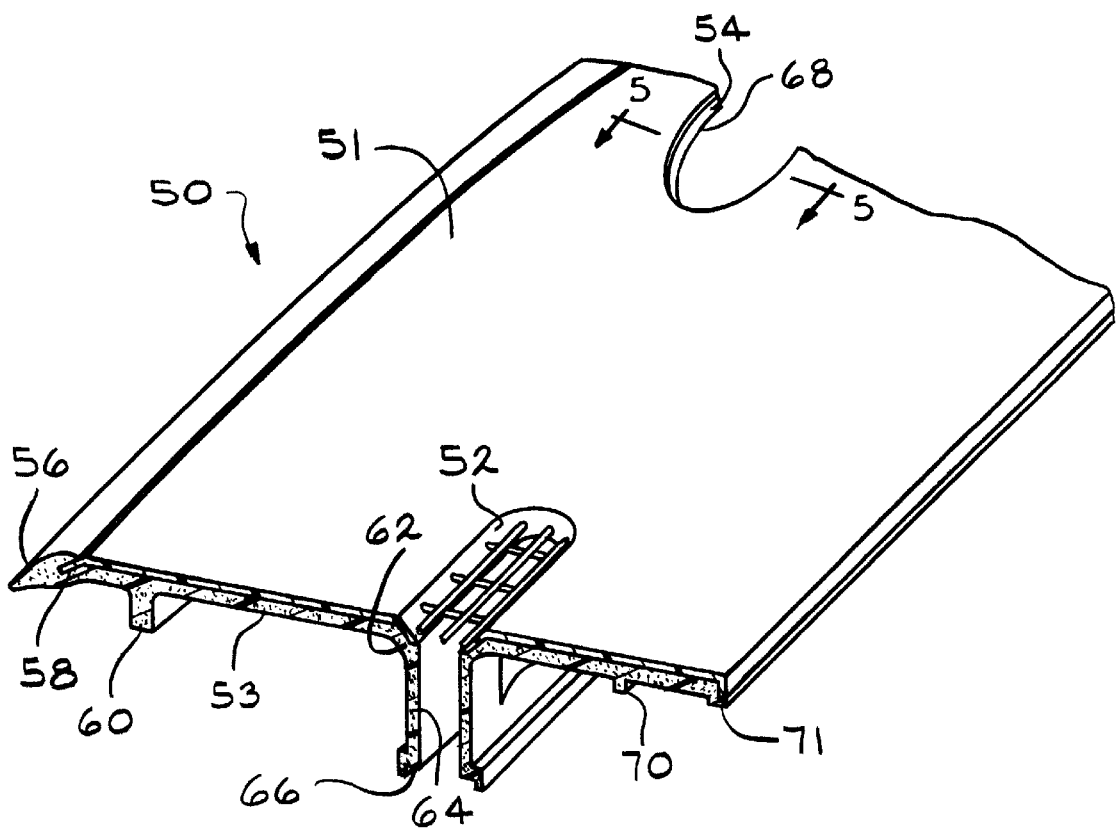
FIG. 3 is a view of the inventive instrument panel top cover.

FIG. 3 shows an improved top cover 50 having an upper skin 51. The vent opening 52 is formed through the skin 51. An underlying foam material 53 provides the sound-deadening function supplied by the separate foam or cotton in the prior art. Foam 53 is integrally molded beneath the skin 51.

As shown, a speaker opening 54 also extends through the skin 51. A windshield lip seal 56 is integrally molded around a forward ledge 58 of the top skin 51. Seal 56 extends on both sides of ledge 58.

A spacer 60 is preferably integrally molded with the foam 53. The gasket portion 62 for sealing between the duct 64 and the top skin 51 is formed integrally along with the lower gasket 66. That is, portion 62, 64 and 66 are an integrally molded single foam part which replaces all three of the parts 36, 38, 40, as shown in prior art FIG. 2.

A foamed gasket 68 is connected to the speaker, and replaces the separate gasket 48, as shown in FIG. 2. Portion 70 is another spacer member, and portion 71 replaces the anti-squeak tape of the prior art.

Figure 4:
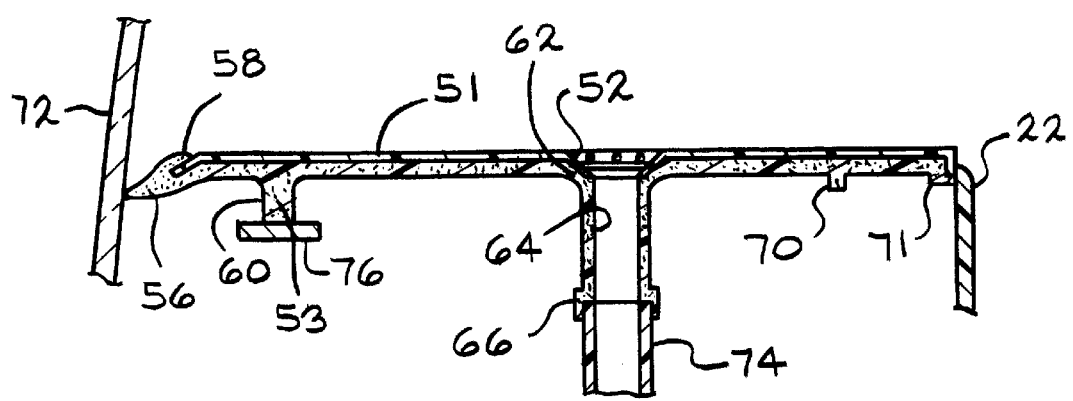
FIG. 4 is a cross-sectional view through the instrument panel of FIG. 3.

As shown in FIG. 4, the foam seal 56 abuts the inner surface of windshield 72. An air supply 74 seals against the gasket 66 to supply air into the duct 64. A support surface 76 contacts the spacer 60. The forward instrument panel portion 22 abuts the gasket 71 to provide an anti-squeak connection.

Figure 5:
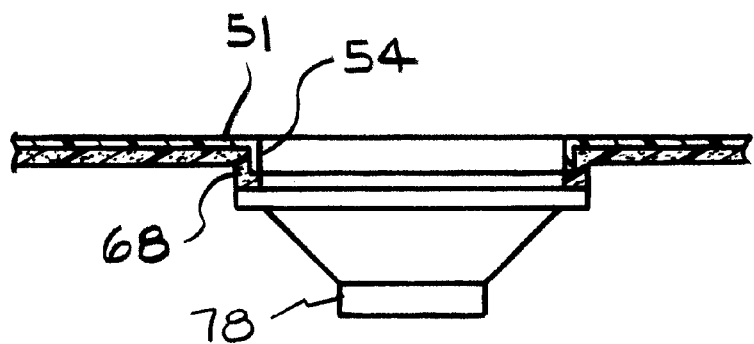
FIG. 5 is a cross-sectional view along line 5—5 as shown in FIG. 3.

As shown in FIG. 5, the speaker 78 is sealed against the gasket 68. Again, the portion 68 is integrally molded with the foam portion 53.

Figure 6:
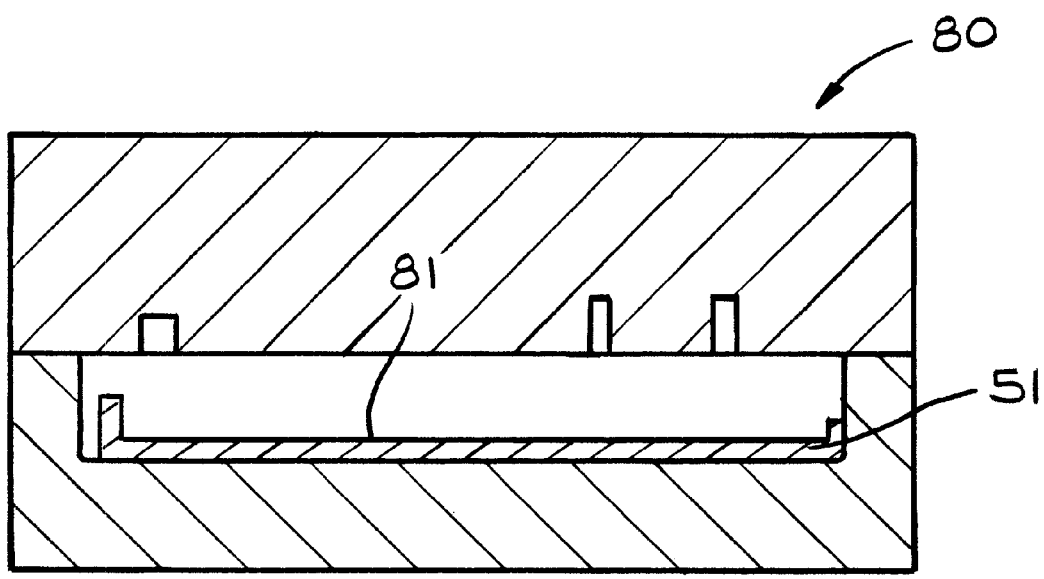
FIG. 6 is a highly schematic view of a mold used to make the present invention.

FIG. 6 schematically shows a mold 80 for receiving the skin 51 and then molding the complex foam material 53 beneath the skin 51. As shown, a cavity 81 defines the shape of the foam backing. It should be understood that other molding techniques may be utilized, and the particular molding technique is shown by way of example only. As an example, so-called "two-shot" molding techniques may be utilized for first molding the skin 51, and then molding the underlying foam 53.

In summary, the present invention provides an instrument panel top cover that replaces a number of separate components as have been utilized in the prior art. The present invention simplifies the complexity of assembly and expense of forming instrument panel top covers. In addition, by integrally molding the foam components to the skin, the present invention results in better positioning and closer tolerances when compared to the separate components of the prior art.

Preferably, the foam is made of a material which is more resilient than the outer skin. The outer skin may be formed of a relatively rigid plastic, although the outer skin may also be formed of various foams in some applications.

Although a preferred embodiment of this invention has been disclosed, a worker in this art would recognize that many modifications would come within the scope of this invention. For that reason, the following claims should be studied to determine the true scope and content of this invention.

What is claimed is:

1. An instrument panel assembly comprising:

an instrument panel facing into a vehicle compartment;

an instrument panel top cover received adjacent said instrument panel, said instrument panel top cover including an outer skin, and an underlying foam backing material, said underlying foam backing material including an integrally molded air duct extending away from said outer skin and having an integrally molded gasket at an end of said air duct remote from said outer skin, said outer skin being formed with at least one opening aligned with said air duct; and a portion of said outer skin remote from said instrument panel provided with an integrally molded foam strip extending on both inner and outer sides of said outer skin and across an edge of said top skin remote from said top panel, said portion for sealing against a windshield.

2. An assembly as recited in claim 1, wherein a spacer for contacting a support member is integrally molded from said foam.

3. An instrument panel assembly as recited in claim 1, wherein a second opening extends through said top skin, and a foam gasket is formed in said foam integrally beneath said second opening, said second opening being for receiving a speaker.

4. An instrument panel assembly as recited in claim 1, wherein said outer skin is formed of a rigid plastic and said foam backing material being formed of a resistant foam material.

5. An instrument panel assembly as recited in claim 1, wherein said foam backing material contacts an inner surface of said instrument panel to provide resilient surface between said instrument panel and said top cover.

6. A vehicle interior comprising:

a windshield;

an instrument panel front panel positioned inwardly from said windshield;

an instrument panel top cover extending between said forward panel and said windshield, said instrument panel top cover including an outer skin, and an underlying foam material formed of a resistant foam material, said foam material extending along the underside of said outer skin for providing sound absorption, and said foam material wrapping around an end of said outer cover adjacent said windshield, said integrally molded foam contacting said windshield and providing a seal between said windshield and said instrument panel top cover.

7. A vehicle interior as recited in claim 6, wherein a portion of said outer skin remote from said front panel is provided with an integrally molded foam strip extending on both inner and outer sides of said outer skin and across an edge of said top skin remote from said front panel, said portion for sealing against a windshield.

8. A vehicle interior as recited in claim 6, wherein a spacer for contacting a support member is integrally molded from said foam.

9. A vehicle interior as recited in claim 6, wherein a second opening extends through said top skin, and a foam gasket is formed in said foam integrally beneath said second opening, said second opening being for receiving a speaker.

10. A vehicle interior as recited in claim 6, wherein said outer skin is formed of a rigid plastic and said foam backing material being formed of a resistant foam material.

11. A vehicle interior as recited in claim 6, wherein said foam backing material contacts an inner surface of said instrument panel to provide resilient surface between said instrument panel and said top cover.

* * * * *